US009650991B2

(12) United States Patent
Jasklowski (10) Patent No.: US 9,650,991 B2
(45) Date of Patent: May 16, 2017

(54) PIVOTING RING PETAL ACTUATION FOR VARIABLE AREA FAN NOZZLE (71) Applicant: The Boeing Company, Chicago, IL (US)

(72) Inventor: Christopher T. Jasklowski, Redmond, WA (US)

(73) Assignee: The Boeing Company, Chicago, IL (US)

(*) Notice: Subject to any disclaimer, the term of this patent is extended or adjusted under 35 U.S.C. 154(b) by 951 days.

(21) Appl. No.: 13/928,407

(22) Filed: Jun. 27, 2013

(65) Prior Publication Data
US 2015/0000305 A1    Jan. 1, 2015

(51) Int. Cl.
F02K 1/18    (2006.01)
F02K 1/12    (2006.01)
F02K 1/72    (2006.01)

(52) U.S. Cl.
CPC .............. F02K 1/18 (2013.01); F02K 1/1207 (2013.01); F02K 1/72 (2013.01); F05D 2250/11 (2013.01); F05D 2260/56 (2013.01)

(58) Field of Classification Search
CPC . F02K 1/18; F02K 1/1207; F02K 1/72; F02K 3/075; F05D 2260/56
See application file for complete search history.

(56) References Cited

U.S. PATENT DOCUMENTS

| 3,892,358 | A | * | 7/1975 | Gisslen | F02K 1/805 |
| | | | | | 239/265.39 |
| 5,485,959 | A | * | 1/1996 | Wood | F02K 1/002 |
| | | | | | 239/265.19 |
| 5,806,302 | A | | 9/1998 | Cariola et al. | |

(Continued)

FOREIGN PATENT DOCUMENTS

CN    1277657 A    12/2000
EP    0557229 A1   8/1993
(Continued)

OTHER PUBLICATIONS

Extended European Search Report, European Patent Application No. 14172803.0 (European counterpart of the instant U.S. patent application), dated Oct. 6, 2014.

(Continued)

Primary Examiner — Craig Kim
(74) Attorney, Agent, or Firm — Ostrager Chong Flaherty & Broitman P.C.

(57) ABSTRACT

A variable area fan nozzle comprising an array of rigid petals and a petal actuation system comprising left and right assemblies, each assembly comprising: a multiplicity of tracks attached to or integrally formed with respective petals; a curved pivoting ring segment; an actuator coupled to the ring segment; and a multiplicity of sets of cam followers spaced along the ring segment and aligned with respective tracks. Each ring segment is pivotable between first and second angular positions depending on how the state of the actuator changes. As one ring segment pivots in one direction, one set of cam followers exert inward forces on the tracks to deflect petals inward; as that ring segment pivots in the other direction, another set of cam followers exert outward forces on the tracks to deflect petals outward.

18 Claims, 7 Drawing Sheets

(56) References Cited

U.S. PATENT DOCUMENTS

| | | | |
|---|---|---|---|
| 6,102,307 A * | 8/2000 | Elorriaga | F02K 1/008 239/265.39 |
| 6,192,671 B1 * | 2/2001 | Elorriaga | F02K 1/008 239/265.39 |
| 6,195,981 B1 * | 3/2001 | Hanley | F02K 1/008 239/265.35 |
| 6,199,772 B1 * | 3/2001 | Renggli | F02K 1/008 239/265.19 |
| 6,375,095 B1 * | 4/2002 | Feder | F02K 1/008 239/265.41 |
| 6,983,588 B2 | 1/2006 | Lair | |
| 7,721,549 B2 | 5/2010 | Baran | |
| 7,874,142 B2 | 1/2011 | Beardsley | |
| 8,127,532 B2 | 3/2012 | Howe | |
| 8,316,646 B2 | 11/2012 | Baran | |
| 8,393,857 B2 | 3/2013 | Copeland et al. | |
| 2009/0097967 A1 | 4/2009 | Smith et al. | |
| 2009/0226303 A1 | 9/2009 | Grabowski et al. | |
| 2009/0266912 A1 | 10/2009 | Gukeisen | |
| 2010/0115958 A1 | 5/2010 | Parham | |
| 2010/0229527 A1 | 9/2010 | Amkraut et al. | |
| 2010/0269485 A1 | 10/2010 | Jain | |
| 2013/0020408 A1 | 1/2013 | Jasklowski et al. | |

FOREIGN PATENT DOCUMENTS

| | | |
|---|---|---|
| EP | 0848152 A2 | 6/1998 |
| WO | 2008045048 A1 | 4/2008 |
| WO | 2008045062 A1 | 4/2008 |
| WO | 2009029401 A3 | 3/2009 |

OTHER PUBLICATIONS

Canadian Office Action dated Mar. 15, 2016 in Canadian Patent Application No. 2,852,432 (Canadian counterpart of he instant U.S. patent Application).

Chinese Office Action dated Nov. 9, 2016 in Chinese Patent Application No. 2014102813266 (Chinese counterpart of the instant U.S. patent Application).

English Abstract of CN1277657A.

* cited by examiner

PIVOTING RING PETAL ACTUATION FOR VARIABLE AREA FAN NOZZLE

BACKGROUND

This disclosure relates generally to turbofan engines and, more particularly, to turbofan engines having a variable area fan nozzle. In particular, this disclosure relates to variable area fan nozzles that comprise a plurality of circumferentially arranged petals for varying the exit or throat area of the nozzle.

One approach to increasing the fan nozzle throat area as a means to reduce noise generated during high-thrust events such as during takeoff is through the use of movable rigid flaps or petals which form the fan nozzle exit external boundary. These rigid flaps or petals may be deflected outwardly to enlarge the throat area of the fan nozzle and thereby reduce the exhaust velocity or, conversely, they may be deflected inwardly to reduce the throat area of the fan nozzle and thereby increase the exhaust velocity.

An additional consideration in a variable area fan nozzle for reducing exhaust noise is that a movable fan nozzle must be compatible with thrust reversers commonly employed on modern turbofan engines. As is known in the art, thrust reversers on turbofan engines may reduce landing distance of an aircraft in normal (e.g., dry) runway conditions or increase safety in slowing the aircraft in slick (e.g., wet) runway conditions. Thrust reversers operate by reorienting the normally aftward flow of exhaust gasses into a forward direction in order to provide braking thrust to the aircraft. The reorienting of the engine exhaust gases is facilitated by spoiling, deflecting and/or turning the flow stream of the primary exhaust and/or the fan exhaust.

For turbofan engines, thrust reversers may include the use of cascade baskets, pivoting doors or by reversing the pitch of the fan blades. In a cascade-type thrust reverser, the turbofan engine may include an outer axially translatable thrust reverser sleeve which is configured to move axially aftward to uncover cascade baskets mounted in the nacelle cowl and comprising a multiplicity of flow-deflecting vanes. Simultaneous with the aftward movement of the translating sleeve, blocker doors in the fan duct are closed in order to redirect the fan flow outwardly through the flow-deflecting vanes and into a forward direction to provide thrust-reversing force. In some implementations, the cascade baskets are disposed between the thrust reverser sleeve and the portion of fan duct outer wall connected to the thrust reverser sleeve. Due to the widespread implementation of thrust reversal capability on many aircraft, a variable area fan nozzle must be compatible with thrust reverser systems commonly employed on modern turbofan engines It is known to vary the area of the fan nozzle (thereby modulating the fan flow) by deflecting flaps or panels (hereinafter "petals") which are hinged to the trailing lip area of an axially translatable thrust reverser sleeve. As used herein, the term "thrust reverser sleeve" includes at least the following configurations: (1) a one-piece axially translatable sleeve that extends around a major portion of the circumference of the fan duct, from one side of the engine pylon to the other; and (2) two axially translatable half-cowls mounted on rails fixed to upper and lower beams and extending from the upper beam to the lower beam. In accordance with the latter configuration, the upper beam is the main hinge beam that allows the half-cowls to open for engine access and removal. The lower beam (referred to hereinafter as "latch beam") provides a means for locking the two half-cowls together. Thus the second configuration typically has two upper hinge beams and two latch beams.

A variety of solutions for actuation of a variable area fan nozzle exist, but there is room for improvements.

SUMMARY

The subject matter disclosed herein is directed to a compact petal actuation system that can be actuated by one or more actuators. In accordance with the embodiments disclosed herein, a petal actuation system comprises a pair of pivoting ring segments, each ring segment carrying a plurality of spaced-apart sets of cam followers for interacting with corresponding camming surfaces of individually shaped petal-mounted actuation tracks.

Variable area fan nozzles incorporating the petal actuation systems disclosed hereinafter allow the fan flow in a turbofan engine to be modulated by varying the exit or throat area at the trailing edge of a fan duct or thrust reverser sleeve. The petal actuation system can be employed to control the throat area of the nozzle by deflecting petals inward or outward using a pair of pivoting ring segments that pivot in response to extension/retraction of respective actuators. Each ring segment carries cam followers (e.g., rolling or sliding elements) that contact opposing tracks on at least a majority of the petals. The throat area can be controlled as a function of the angular positions of the pivoting ring segments. When the actuators change from a first state to a second state, the throat area decreases, and when the actuators change from the second state to the first state, the throat area increases. The fan nozzle throat area may be adjusted to under-area (compared to nominal area at cruise), which benefits fuel consumption during certain segments of flight mission, or to over-area, contributing to noise reduction and improving fan operability.

In accordance with one aspect, a variable area fan nozzle comprises an array of rigid petals and a petal actuation system comprising left and right assemblies, each assembly comprising: a multiplicity of tracks attached to or integrally formed with respective petals; a curved pivoting ring segment that is pivotable about an axis perpendicular to a centerline of the nozzle; an actuator or a linkage coupled to the ring segment; and sets of cam followers spaced along the ring segment. The ring segments pivot about axes which are perpendicular to a centerline of the nozzle. Each ring segment can pivot back and forth between first and second angular positions depending on whether its actuator or linkage changes from a first state to a second state or from the second state to the first state. As one ring segment pivots in one direction, one set of cam followers exert inward forces on the tracks to deflect petals inward; as that ring segment pivots in the other direction, another set of cam followers exert outward forces on the tracks to deflect petals outward.

To explain one principle of operation, one implementation having eight petals on each side of an engine nacelle will be disclosed. In the particular embodiment to be disclosed, six of the eight petals on each side have tracks. The end petals adjacent the hinge and latch beams do not have tracks in order to mitigate small displacement of the ring segment at the end petals. The end petals (without tracks) may be coupled to the respective adjacent petals (with tracks) so that the end petals will also deflect when the adjacent petals are cammed by associated cam followers carried by the pivoting ring segment.

Another aspect of the subject matter disclosed herein is an apparatus installed on a turbofan engine, comprising: (a) a support structure; (b) a first petal hinged to the support structure; (c) a first track attached to or integrally formed with the first petal, the first track comprising a first camming surface; (d) a curved ring segment having first and second ends pivotably coupled to the support structure, the ring segment being pivotable back and forth between first and second angular positions; (e) an actuator coupled to the support structure and to the ring segment so that the ring segment pivots from the first angular position to the second angular position when the actuator changes from a first state to a second state and pivots from the second angular position to the first angular position when the actuator changes from the second state to the first state; and (f) a first cam follower carried by the curved ring segment, the first cam follower being arranged to contact the first camming surface to exert an inward force on the first petal as the ring segment pivots from the first angular position to the second angular position. The apparatus may further comprise: (g) a second petal hinged to the support member; (h) a second track attached to the second petal, the second track comprising a second camming surface; and (i) a second cam follower carried by the curved ring segment. The second cam follower is arranged to contact the second camming surface to exert an inward force on the second petal as the ring segment pivots from the first angular position to the second angular position. In some cases, the first and second camming surfaces will have different contours and the first and second cam followers will travel respective different distances when the actuator changes from the first state to the second state.

A further aspect of the apparatus described in the previous paragraph is that the first track further comprises a first inverted camming surface and the apparatus further comprises a second cam follower carried by the curved ring segment. The second cam follower is arranged to contact the first inverted camming surface to exert an outward force on the first petal as the ring segment pivots from the second angular position to the first angular position. Optionally, the first track further comprises a second inverted camming surface and the apparatus further comprises a third cam follower carried by the curved ring segment. The third cam follower is arranged to contact the second inverted camming surface to exert an outward force on the first petal as the ring segment pivots from the second angular position to the first angular position.

In accordance with another aspect of the subject matter disclosed in detail below, a variable area fan nozzle is provided which comprises left and right fan nozzle assemblies, each of the left and right fan nozzle assemblies comprising: (a) a curved support member; (b) a plurality of petals hinged to respective portions of the support member, the petals of the left and right fan nozzle assemblies defining a throat area; (c) a hinge beam connected to the support member; (d) a latch beam connected to the support member; (e) a curved ring segment having a first end pivotably coupled to the hinge beam and a second end pivotably coupled to the latch beam, the ring segment being pivotable back and forth between first and second angular positions; (f) an actuator coupled to an intermediate portion of the ring segment, wherein the ring segment can be pivoted from the first angular position to the second angular position by changing the state of the actuator from a first state to a second state and then returned to the first angular position by changing the state of the actuator from the second state to the first state; (g) a plurality of tracks attached to or integrally formed with respective petals of the plurality of petals, each of the tracks comprising a respective camming surface; and (h) a first plurality of cam followers carried by the ring segment, the cam followers of the first plurality of cam followers being located at respective angular positions along the ring segment. Each cam follower of the first plurality of cam followers contacts a respective one of the camming surfaces to exert inward forces on the petals as the ring segment pivots from the first angular position to the second angular position. Adjacent camming surfaces have different contours. Adjacent cam followers of the first plurality of cam followers travel different distances on the respective camming surfaces as the ring segment pivots from the first angular position to the second angular position.

A further aspect of the variable area fan nozzle described in the previous paragraph is that each of the tracks further comprises a first inverted camming surface, and each of the left and right fan nozzle assemblies further comprises a second plurality of cam followers carried by the curved ring segment. Each cam follower of the second plurality of cam followers travels on a respective one of the first inverted camming surfaces to exert outward forces on the petals as the ring segment pivots from the second angular position to the first angular position. Optionally, each of the tracks further comprises a second inverted camming surface, and each of the left and right fan nozzle assemblies further comprises a third plurality of cam followers carried by the curved ring segment, wherein each cam follower of the third plurality of cam followers travels on a respective one of the second inverted camming surfaces to exert outward forces on the petals as the ring segment pivots from the second angular position to the first angular position.

In accordance with some implementations, the variable area fan nozzle further comprises a plurality of biasing means supported by the support member, each of the biasing means being arranged to exert an inward biasing force that urges a respective one of the petals to deflect inward.

Yet another aspect of the disclosed subject matter is a variable area fan nozzle comprising left and right fan nozzle assemblies, each of the left and right fan nozzle assemblies comprising: (a) a support structure comprising a curved section; (b) a plurality of petals hinged to respective portions of the curved section of the support member, the petals defining a throat area; (c) a plurality of tracks attached to or integrally formed with respective petals of the plurality of petals, each of the tracks comprising a respective outward-facing camming surface; (d) a curved ring segment having first and second ends pivotably coupled to the support structure, the ring segment being pivotable back and forth between first and second angular positions; (e) an actuator coupled to an intermediate portion of the ring segment, wherein the ring segment can be pivoted from the first angular position to the second angular position by changing the state of the actuator from a first state to a second state and then returned to the first angular position by changing the state of the actuator from the second state to the first state; and (f) a first plurality of cam followers disposed at spaced intervals along the ring segment and in respective alignment with said outward-facing camming surfaces of said tracks, wherein said cam followers of said first plurality exert inward forces on the tracks when the actuator changes from the first state to the second state.

A further aspect of the variable area fan nozzle described in the previous paragraph is that each of the tracks may further comprise at least one inward-facing camming surface, and each of the left and right fan nozzle assemblies may further comprise a second plurality of cam followers disposed in respective alignment with said outward-facing camming surfaces of said tracks, wherein said cam followers of said second plurality exert outward forces on the tracks when the actuator is retracted. In accordance with one implementation, each of the cam followers comprises a respective roller.

Other aspects of the aforementioned petal actuation systems are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various implementations will now be described as applied to the thrust reverser sleeve of a turbofan aircraft engine. However, the variable area fan nozzle systems disclosed also have application to the trailing lip area of fan ducts which do not incorporate a thrust reverser sleeve. Furthermore, although some implementations will be described in the context of a single VAFN assembly, it should be understood that the features described are applicable to each of left and right VAFN assemblies making up a variable area fan nozzle or to a single VAFN assembly incorporated to a continuous fan duct ring.

Figure 1:
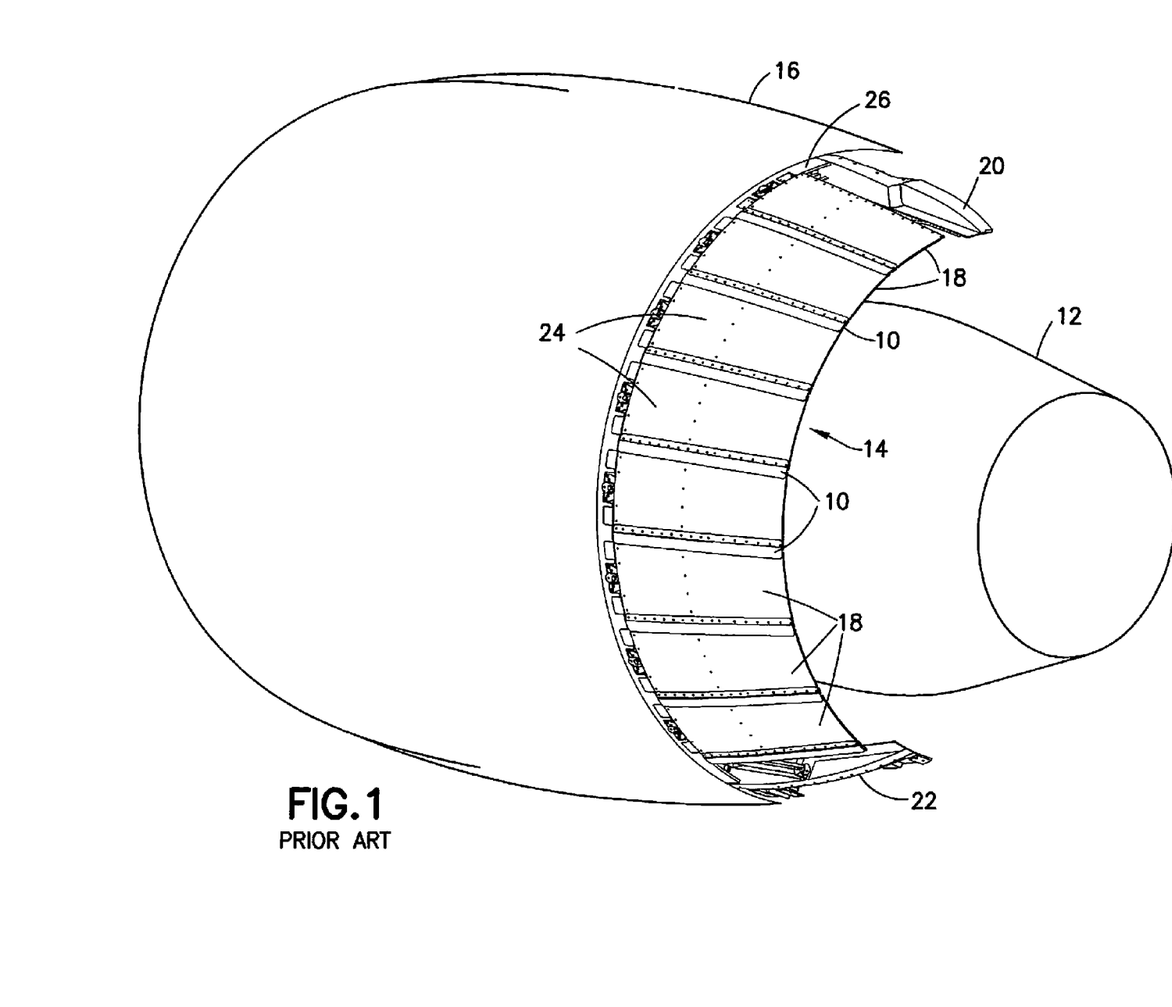
FIG. 1 is a schematic isometric view of portions of an aircraft turbofan engine having a variable area fan nozzle comprising left and right assemblies (only the left assembly is shown).

FIG. 1 shows an isometric view of portions of an aircraft turbofan engine having a variable area fan nozzle comprising left and right assemblies (only the left assembly is shown). A core engine nacelle surrounds the core engine (not shown). The turbofan engine provides thrust from both a core flow of engine exhaust exiting a core flow nozzle 12 (also known as a "primary exhaust nozzle") that forms a downstream end of the core engine nacelle which surrounds the core engine, and a fan flow exiting from a variable area fan nozzle 14 (only the left assembly is shown) mounted to the downstream end or lip area of a thrust reverser sleeve 16.

The sleeve 16 overlaps at least a portion of the core engine nacelle. The core flow generally has a higher velocity than the fan flow.

In accordance with one implementation, the variable area fan nozzle 14 comprises a multiplicity of rigid petals 18 which are configured to alter the fan flow passing through the fan duct when the petals are deflected inward or outward. Each petal 18 comprises a removable cover 24. Optionally, the petals 18 may have chevrons (not shown) attached to the distal (i.e., aft) ends thereof. The petals 18 are disposed side by side along to the trailing lip of the thrust reverser sleeve 16. On the one hand, if the thrust reverser sleeve is a one-piece axially translatable sleeve, then the petal array extends around a major portion of the circumference of the fan duct, from one side of the engine pylon to the other. On the other hand, if the thrust reverser sleeve comprises two axially translatable half-cowls mounted on rails fixed to a hinge beam 20 and a latch beam 22, then the petal array consists of two sets of petals attached to the respective half-cowls, each petal set extending from a respective hinge beam to a respective latch beam on a respective side of the engine. Each hinge beam 20 and each latch beam 22 may respectively comprise a single integrally formed part or an assembly of parts.

In accordance with the implementation shown in FIG. 1, the forward ends of petals 18 are coupled by respective hinges or flexible elements (not shown) to a bulkhead 26 having the shape of a circular arc which is centered at an axis (i.e., the nacelle centerline). The ends of the arc-shaped bulkhead 26 are respectively connected to hinge beam 20 and to latch beam 22. A control system is configured to control an actuation system (not shown in FIG. 1) which deflects the petals 18 inward from their nominal positions during cruise flight conditions to maximize fuel efficiency. When the actuation system is reversed, the petals return to their nominal positions.

The variable area fan nozzle 14 comprises two sets of hinged petals 18 arranged on opposite sides of an engine pylon. Only one set of petals 18 is shown in FIG. 1. Adjacent petals 18 are separated by a triangular or trapezoidal gap or space, each such gap being occupied by a respective elastomeric seal (not shown in FIG. 1), which is fastened to adjoining petals to ensure zero leakage. The elastomeric seals are covered by respective gap covers 10, each gap cover 10 being attached to the left edge of a respective petal 18 and being not attached to the adjacent petal, which allows the gaps to alternately narrow and widen respectively as the petals alternately move inward and outward.

Figure 2:
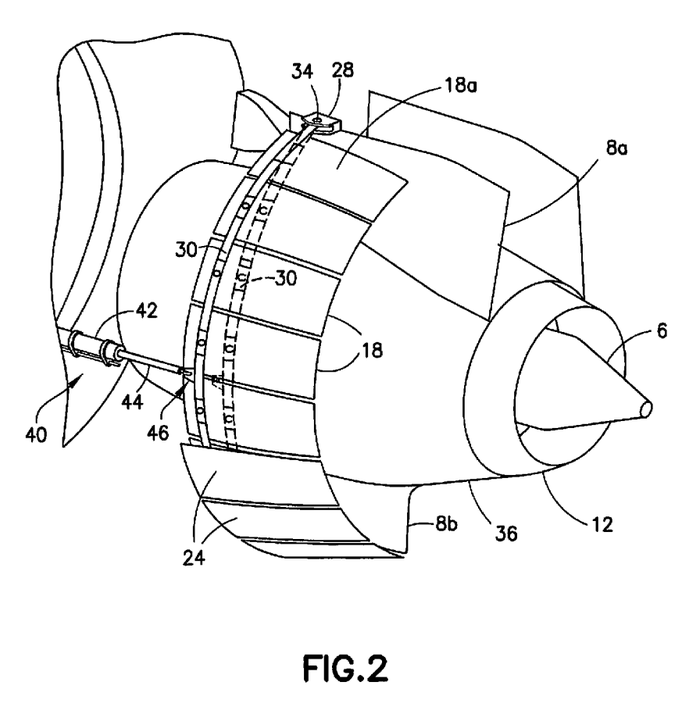
FIG. 2 is a schematic isometric view of portions of an aircraft turbofan engine having a variable area fan nozzle comprising left and right assemblies (only the left assembly is shown), each assembly comprising a plurality of rigid petals, a pivoting ring segment, and an actuator in accordance with one implementation.

Referring to FIG. 2, the engine assembly includes a core engine (not shown in FIG. 2) having an attached tail cone exhaust plug 6. The primary exhaust flow is discharged from the core engine nozzle 12 after passing through the core engine and is partly defined by tail cone exhaust plug 6. A second component stream passes through an annular fan duct which surrounds the core engine. The second component stream, referred to as the fan exhaust flow, exits a fan nozzle collectively defined by an aft edge of a variable area fan nozzle 14 and an fan duct inner wall 36 which surrounds the core engine. The fan exhaust stream and the primary exhaust stream collectively form the thrust that is generated by the engine. As partly shown in FIG. 2, the variable area fan nozzle 14 comprising left and right assemblies (only the left assembly is partly shown). Each VAFN assembly comprises an array of circumferentially positioned rigid petals 18 disposed along the aft edge of a thrust reverser sleeve (not shown in FIG. 2). Each VAFN assembly further comprises a cowl assembly that defines a portion of the fan duct. Each cowl assembly comprises an upper bifurcation wall 8a, a fan duct inner wall 36, and a lower bifurcation wall 8b (the fan duct outer wall of the cowl assembly, which is connected to and translatable with the thrust reverser sleeve, is also not shown in FIG. 2).

In accordance with the implementation shown in FIG. 2, each VAFN assembly comprises an array of circumferentially positioned rigid petals 18, a curved (e.g., circular arc-shaped) ring segment 30 that is pivotable to cause at least a majority of the petals 18 to deflect inward or outward, and an actuator 40 swivably coupled to ring segment 30 for causing the latter to pivot. Each pivoting ring segment 30 passes through (i.e., is encapsulated by) a respective set of petal assemblies, i.e., between the petals 18 and the petal covers 24 and through the petal side ribs (not shown in FIG. 2, but see petal side ribs 62 in FIG. 3). In FIG. 2, the petal covers 24 have been removed from the uppermost five petals 18 for the purpose of revealing the ring segment 30, which would otherwise not be visible from outside. All or a majority of the petals 18 can be deflected inward or outward in response to pivoting of a respective ring segment 30. In accordance with the implementation shown in FIG. 2, each assembly comprises eight petals. To mitigate small displacement of the ring segment 30 at the two end petals (e.g., end petal 18a), the end petals can have a width less than the width of the other six petals and can be configured such that the end petals do not interact with the ring segment 30 directly. The end petals may instead be mechanically coupled to respective adjacent petals so that the end petals deflect when the adjacent petals are deflected by the pivoting ring segment 30.

FIG. 2 further shows one end of ring segment 30 pivotably coupled to a rigid strongback 28 by means of a pivot pin 34 that is rotatably supported by a pair of bearings (not shown in FIG. 2). The strongback 28 is affixed or rigidly coupled to a hinge beam (not shown). The other end of the ring segment 30 (not visible in FIG. 2) is pivotably coupled to a strongback affixed or rigidly coupled to a latch beam (not shown in FIG. 2). Alternatively, the strongbacks can be integrally formed with and become part of the hinge and latch beams. The other ring segment (of the right assembly) is pivotably coupled to the other hinge beam and the other latch beam of the support structure (not shown in FIG. 2) in a similar manner. In accordance with one implementation, the pivot axes of the pivoting ring segments 30 can be perpendicular to a centerline of the nozzle. Optionally, the pivot axes of the pivoting ring segments 30 can be parallel to each other, but this is not a requirement. The respective ring segments are not mechanically coupled to each other and are actuated by respective actuators 40 that can be independently controlled by a single control computer (not shown in FIG. 2).

FIG. 2 shows ring segment 30 in a first angular (deployed) position (solid lines) and a second angular (stowed) position (dashed lines). When ring segment 30 is in the deployed position, the petals 18 are in outwardly deflected angular positions; when ring segment 30 is in the stowed position, the petals 18 are in inwardly deflected angular positions. The ring segment 30 is in the deployed position when the actuator 40 is retracted (as seen in FIG. 2) and in the stowed position when the actuator 40 is extended (not shown in FIG. 2). In accordance with one implementation, the actuator 40 is a linear actuator comprising a cylinder 42 (housing a piston) and a piston rod 44. The end of the piston rod 44 and an intermediate portion of the ring segment 30 are coupled together by a swivel coupling 46 that allows the intermediate portion of the ring segment 30 to swivel relative to the end of the piston rod 44 as the latter is extended or retracted. In accordance with alternative implementations, the actuators may be any one of a multitude of different types of known electromechanical or pneumatic actuators.

Figure 3:
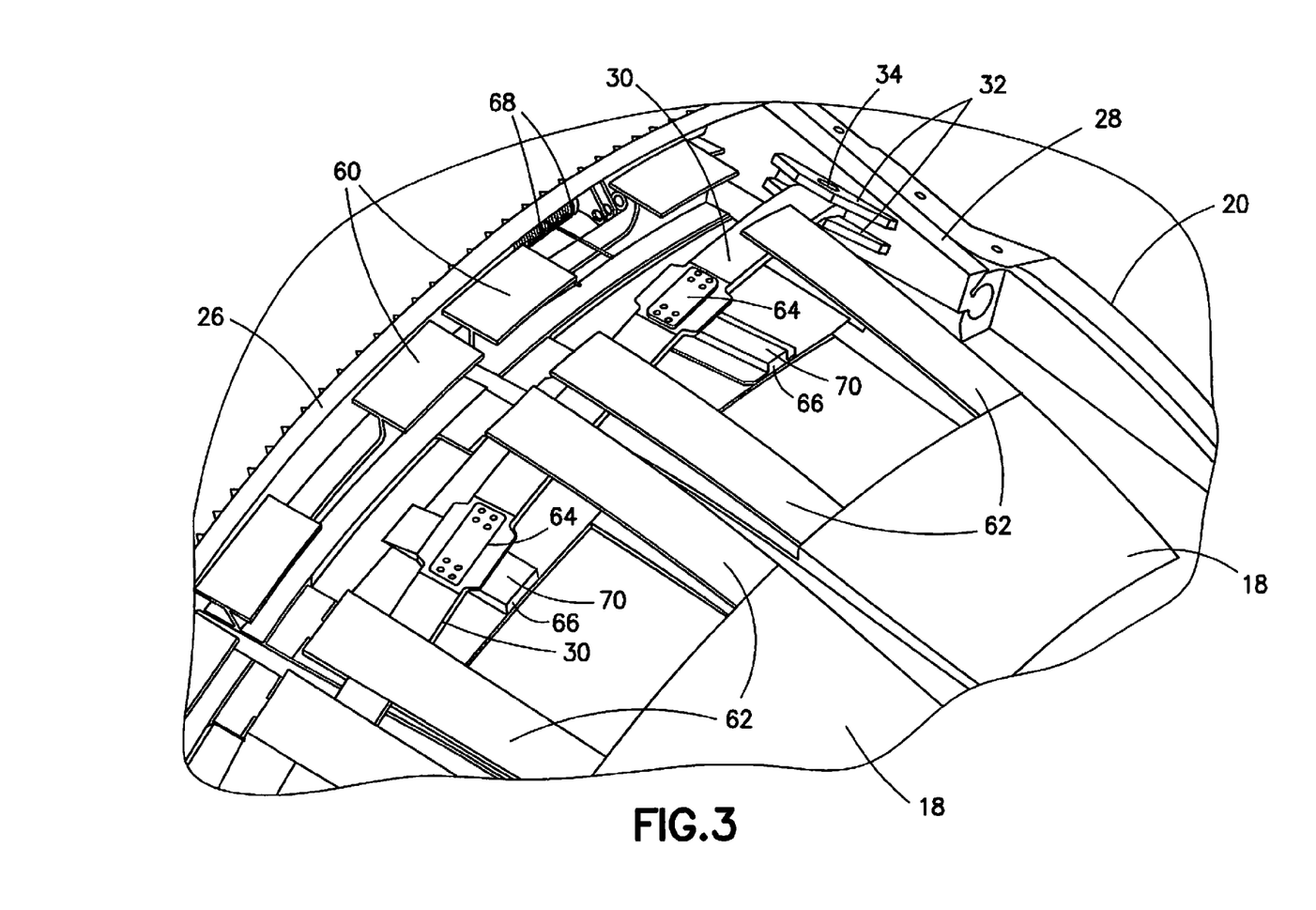
FIG. 3 is a schematic isometric view of an end portion of a pivoting ring segment pivotably coupled to a hinge beam and two petals with their covers removed.

FIG. 3 shows an end portion of a pivoting ring segment 30 pivotably coupled to a strongback 28 which is rigidly coupled to a hinge beam 20. The strongback 28 comprises a pair of bearing-equipped flanges 32 (the bearings are not shown in FIG. 3) which rotatably support opposing ends of a pivot pin 34. (In the alternative, a separate strongback element could be eliminated by fabricating a hinge beam with flanges in the proper positions.) One end of the ring segment 30 is affixed to pivot pin 34. The opposing ends of pivot pin 34 are rotatably supported by a respective pair of bearings (not shown) incorporated in flanges 32. Preferably the pivot axis of pivot pin 34 is coaxial with the pivot axis of a second pivot pin, supported by a latch beam (not shown in FIG. 3), which the other end of ring segment 30 is affixed to. Other functionally equivalent mechanisms for pivotably coupling the ring segment 30 to the strongback 28 may be used in place of that described and illustrated herein.

In accordance with the implementation partially shown in FIG. 3, the left assembly of the petal actuation system comprises a ring segment 30 that carries a multiplicity of sets of cam followers (e.g., rolling or sliding elements) (not visible in FIG. 3) and a corresponding multiplicity of tracks 66 (only two tracks are shown in FIG. 3) attached to or integrally formed with respective petals 18. More specifically, each cam follower set depends from a respective mounting plate 64 which overlies a respective opening (not shown in FIG. 3, but see opening 92 in FIG. 4) in the ring segment 30. The openings are disposed at spaced intervals along the ring segment 30 and are in respective alignment and contact with respective tracks 66, one set of cam followers per track. As ring segment 30 pivots from its stowed position (hereinafter "first angular position") to its deployed position (hereinafter "second angular position"), one cam follower from each set exerts an inward force on an outward-facing camming surface 70 of a respective track 66 sufficient to overcome the resistance of the petal preloading torsion springs (see FIG. 3) to deflect the associated petal 18 inward; as ring segment 30 pivots in the other direction, other cam followers of each set exert outward forces on inward-facing (i.e., inverted) camming surfaces (not visible in FIG. 3, but see FIG. 5)) of a respective track 66 to deflect the corresponding petal 18 outward.

Because the respective sets of cam followers are mounted at spaced intervals along the pivoting ring segment 30, adjacent sets of cam followers will move along parallel arcs of different lengths as the ring segment pivots from a first angular position to a second angular position. For example, if a set of cam followers are mounted at spaced intervals on a pivoting arc-shaped ring segment, then adjacent cam followers will travel different distances along respective parallel arcs which have different radii. Therefore, lengths of the camming surfaces of respective tracks 66 will vary in accordance with the respective distances traveled by the corresponding cam followers. In addition, the camming surfaces of tracks 66 are specifically contoured and oriented to be contacted (and cammed) by respective cam followers as the ring segment 30 pivots. The individual shaping of each camming surface allows for customized petal deflection and thrust vectoring.

In accordance with one implementation, each VAFN assembly comprises eight petals, but only six of the eight petals have tracks. The end petals adjacent the hinge and latch beams do not have tracks in order to mitigate small displacement of the ring segment at the end petals. In this case, the end petals can have a width less than the width of the other six petals and can be mechanically coupled to respective adjacent petals so that the end petals deflect when the adjacent petals are deflected by the pivoting ring segment.

As seen in FIG. 3, each petal 18 is connected to a respective petal forward closure 60, which in turn is coupled to bulkhead 26 by hinges (not shown) that allow the petal 18 to deflect inward and outward. The actuation load for deflecting petals outward can be reduced by coupling petals 18 to respective biasing means that urge the petals 18 to deflect outward. Such biasing means will resist inward petal deflection caused by rotation of a ring segment 30 in one direction, but assist outward deflection of the petals 18 when the ring segment 30 is rotated in the other direction. Such biasing means may take many forms. FIG. 3 shows biasing means comprising a pair of petal preloading torsion springs 68 wound around respective portions of a dual spring support rod (not shown) attached to the bulkhead 26. One end of each petal preloading torsion spring 68 is attached to the bulkhead 26, while the other end is attached to the petal (not shown). The petal preloading torsion springs 68 are arranged to resist inward deflection of the petal 18 when the ring segment 30 pivots from a first angular position to a second angular position and to assist outward deflection of petal 18 when the ring segment 30 pivots from the second angular position to the first angular position.

Figure 4:
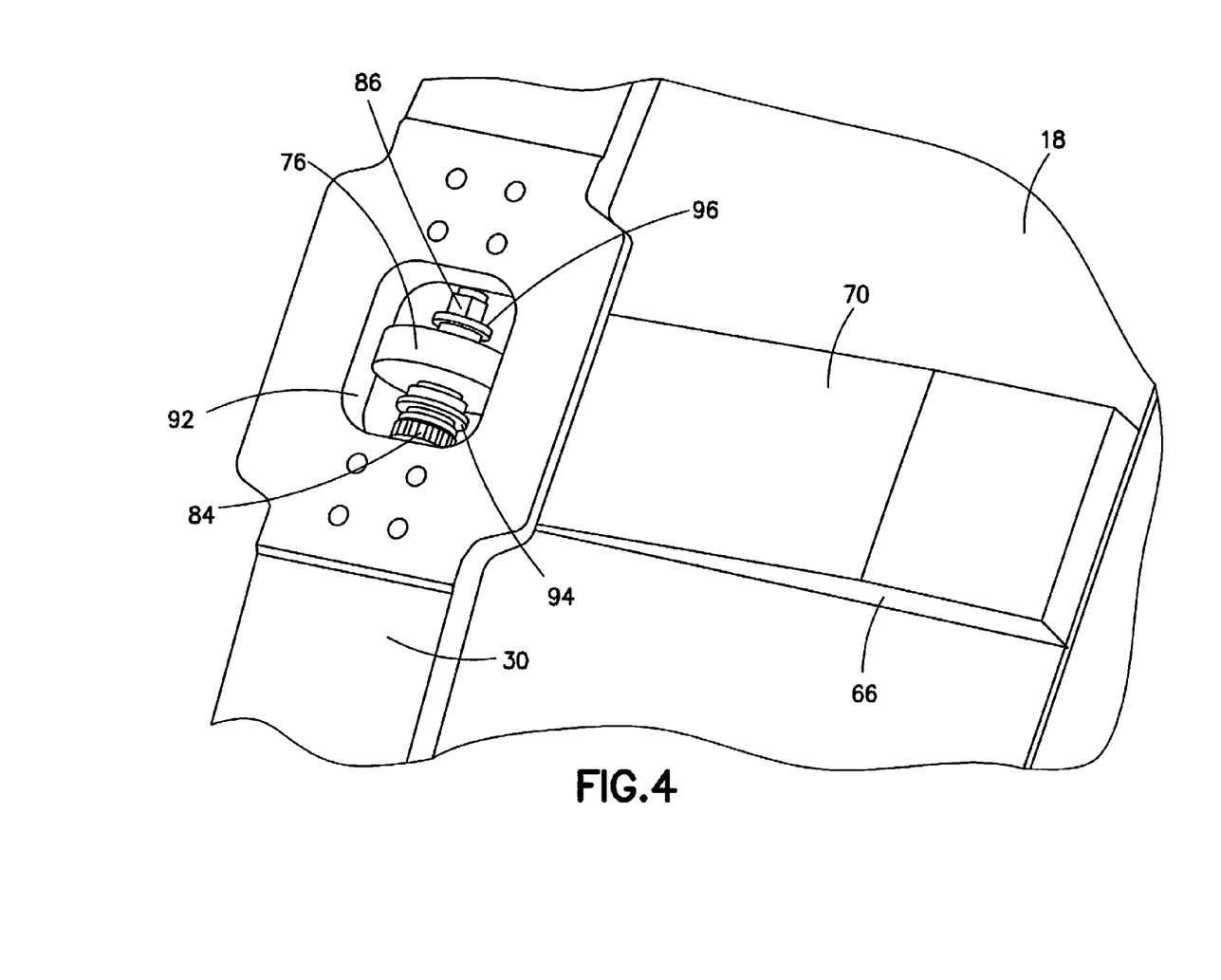
FIG. 4 is a schematic isometric view of means for camming a petal inward comprising a primary roller that rolls on a track attached to a petal in accordance with one implementation. (In other implementations, solid sliding elements can be used instead of rolling elements.)
Figure 5:
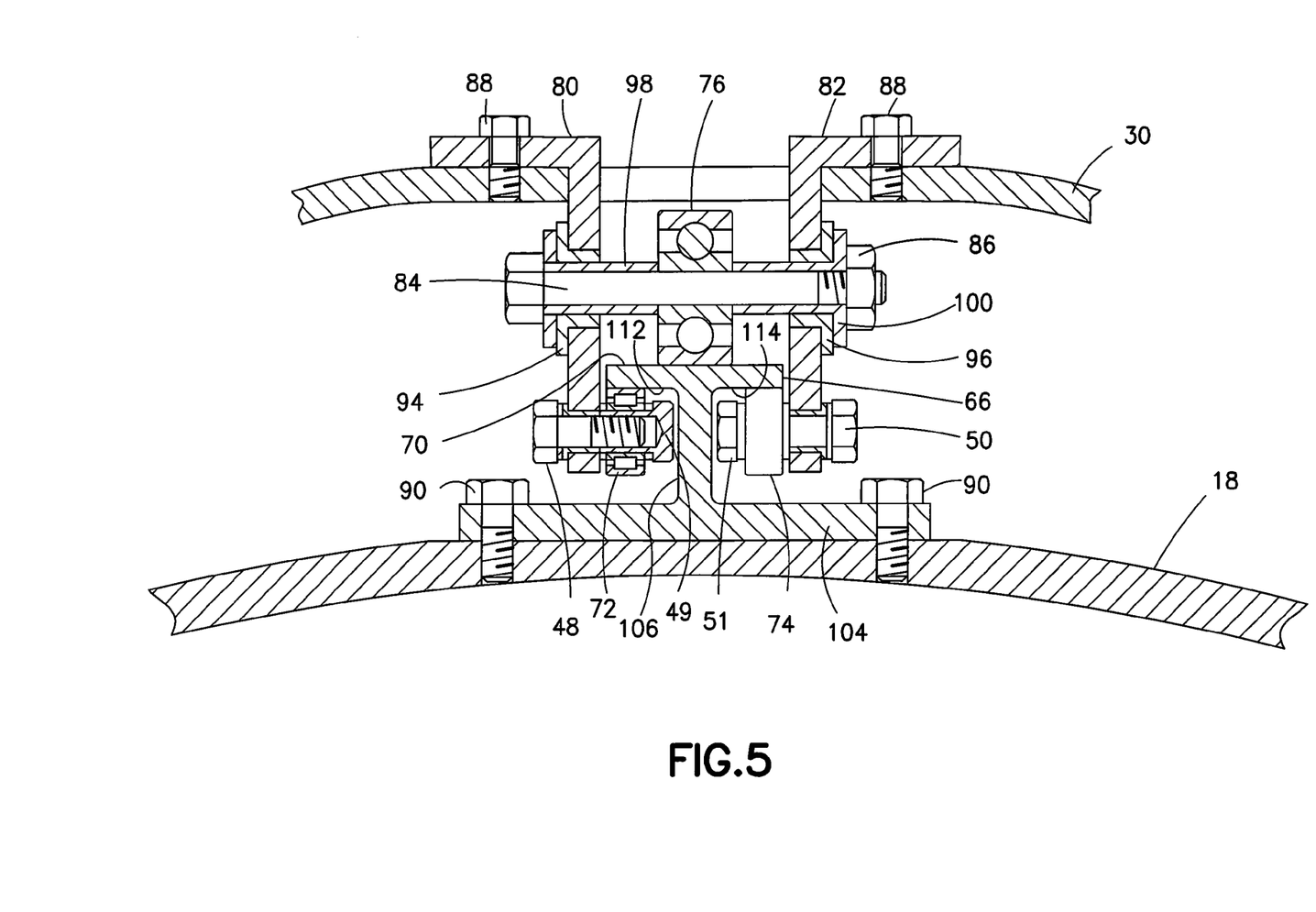
FIG. 5 is a partially sectional view of a camming assembly comprising a petal-mounted track, a primary roller subassembly and two secondary roller assemblies in accordance with the implementation partially shown in FIG. 4.
Figure 6:
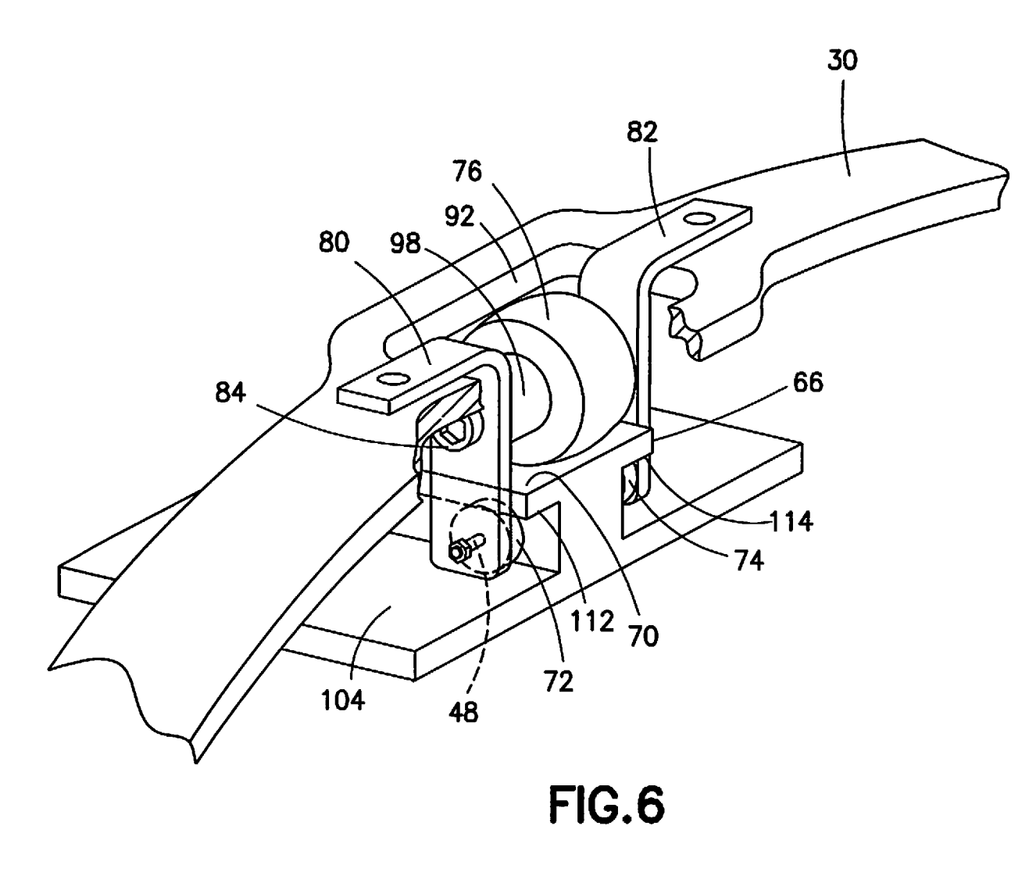
FIG. 6 is a schematic isometric view of the camming assembly depicted in FIG. 5. A portion of the ring segment has been removed to reveal portions of the camming assembly which would otherwise be hidden from view.

In accordance with one implementation shown in FIGS. 4-6, the cam followers may take the form of rollers. The mounting plate has been removed in FIG. 4 to reveal components of a primary roller subassembly that is part of a camming assembly shown in detail in the sectional view of FIG. 5. The primary roller subassembly seen in FIG. 4 comprises a primary roller 76 that rolls on an outward-facing camming surface 70 of a track 66 when ring segment 30 pivots from a first angular position to a second angular position. Track 66 is attached to a petal 18. When the primary roller 76 cams the outward-facing camming surface 70, the petal 18 is deflected inward. As will be explained in detail below with reference to FIG. 5, the primary roller subassembly seen in FIG. 4 comprises an axle 84 in the form of a bolt having a head and a shaft with a threaded end, a nut 86 screwed onto the threaded end of axle 84, a bushing 94 disposed between primary roller 76 and the head of axle 84, and a bushing 96 disposed between primary roller 76 and nut 86.

FIG. 5 is a partially sectional view of a camming assembly comprising a petal-mounted track, a primary roller subassembly and two secondary roller assemblies in accordance with the implementation partially shown in FIG. 4. The primary roller 76 may take the form of a conventional roller bearing mounted to axle 84. The respective ends of axle 84 are supported by bushings 94 and 96, surrounding respective spacers 98 and 100. The spacers 98 and 100 are inserted in respective openings in left and right attachment brackets 80 and 82, which are fastened to the ring segment 30 by respective fasteners 88.

In accordance with the implementation shown in FIG. 5, the primary roller 76 rolls on the outward-facing camming surface 70 of a track 66 having a base 104 which is attached to a petal 18 by a multiplicity of fasteners 90 (only two of which are seen in FIG. 5). As the ring segment 30 pivots from a first angular position to a second angular position, the camming assembly shown in FIG. 5 swings about the pivot axis of the ring segment 30. As the camming assembly moves along an arc-shaped path, the primary roller 76 swings along the same arc. The outward-facing camming surface 70 forms a ramp in the path of the swinging primary roller 76. Due to frictional forces exerted on the outer peripheral surface of the swinging primary roller 76 by the contacting outward-facing camming surface 70, the primary roller 76 rotates about axle 84 and rolls along the outward-facing camming surface 70, following a curved rolling path thereon. Preferably, the outward-facing camming surface 70 has an arc-shaped curvature when viewed from above, the radius of the centerline of the curved surface being the same as the radius of the arc traveled by the swinging primary roller 76. Additionally, the elevation of the outward-facing camming surface 70 may vary nonlinearly, with the surface continuously adjusting so that the lateral portion in contact with the primary roller 76 will be parallel to the axis of primary roller 76.

As seen in FIG. 5, the outward-facing camming surface 70 is supported above the base 104 by a vertical web 106. The outward-facing camming surface 70, vertical web 106 and base 104 may be integrally formed or they may be respective parts of an assembly. As the ring segment 30 pivots from a first angular position to a second angular position, the force exerted by the swinging primary roller 76 against the contacting outward-facing camming surface 70 has the effect of camming the track 66 and deflecting the petal 18 inward. Thus each primary roller 76 serves the function of a cam follower that produces inward deflection of a corresponding petal 18. Depending on the contours and placement of the respective outward-facing camming surfaces 70, the petals 18 can be deflected by different amounts to provide thrust vectoring.

The camming assembly shown in FIG. 5 further comprises a pair of secondary roller subassemblies respectively supported by the left and right attachment brackets 80 and 82. These secondary roller subassemblies respectively comprise secondary rollers 72 and 74 which respectively interact with a pair of inward-facing camming surfaces 112 and 114 formed on track 66. The secondary roller 72 and 74 may take the form of conventional needle bearings mounted on respective nuts 49 and 51, which are in turn screwed onto respective bolts 48 and 50. The inward-facing camming surfaces 112 and 114 are disposed directly underneath respective portions of the outward-facing camming surface 70. The interaction of the secondary rollers 72, 74 and the inward-facing camming surfaces 112, 114 causes the petal 18 to deflect outward when the ring segment 30 is pivoted from the second angular position to the first angular position. Preferably, the contours of the inward-facing camming surfaces 112 and 114 mimic respective portions of the contour of the outward-facing camming surface 70 by fabricating the track 66 so that each arm of its head has a constant thickness along the portion of the track 66 which is contacted by the rolling primary roller 76. As the ring segment 30 pivots from its second angular position to its first angular position, the force exerted by the swinging secondary rollers 72 and 74 against the contacting inward-facing camming surfaces 112 and 114 has the effect of camming the track 66 and deflecting the petal 18 outward. Thus each pair of secondary rollers 72 and 74 serve the function of cam followers that produce outward deflection of a corresponding petal 18.

When the ring segment 30 is pivoted from its second angular position to its first angular position, the secondary roller 72 bears against the inward-facing camming surface 112 and the secondary roller 74 bears against the inward-facing camming surface 114, applying respective forces which, in conjunction with the forces exerted by the petal preloading torsion springs (see FIG. 3), produce a net force that deflects the associated petal outward.

FIG. 6 is a schematic isometric view of the camming assembly depicted in FIG. 5 and described in detail above. A portion of the ring segment 30 has been removed to reveal portions of the camming assembly which would otherwise be hidden from view.

Figure 7:
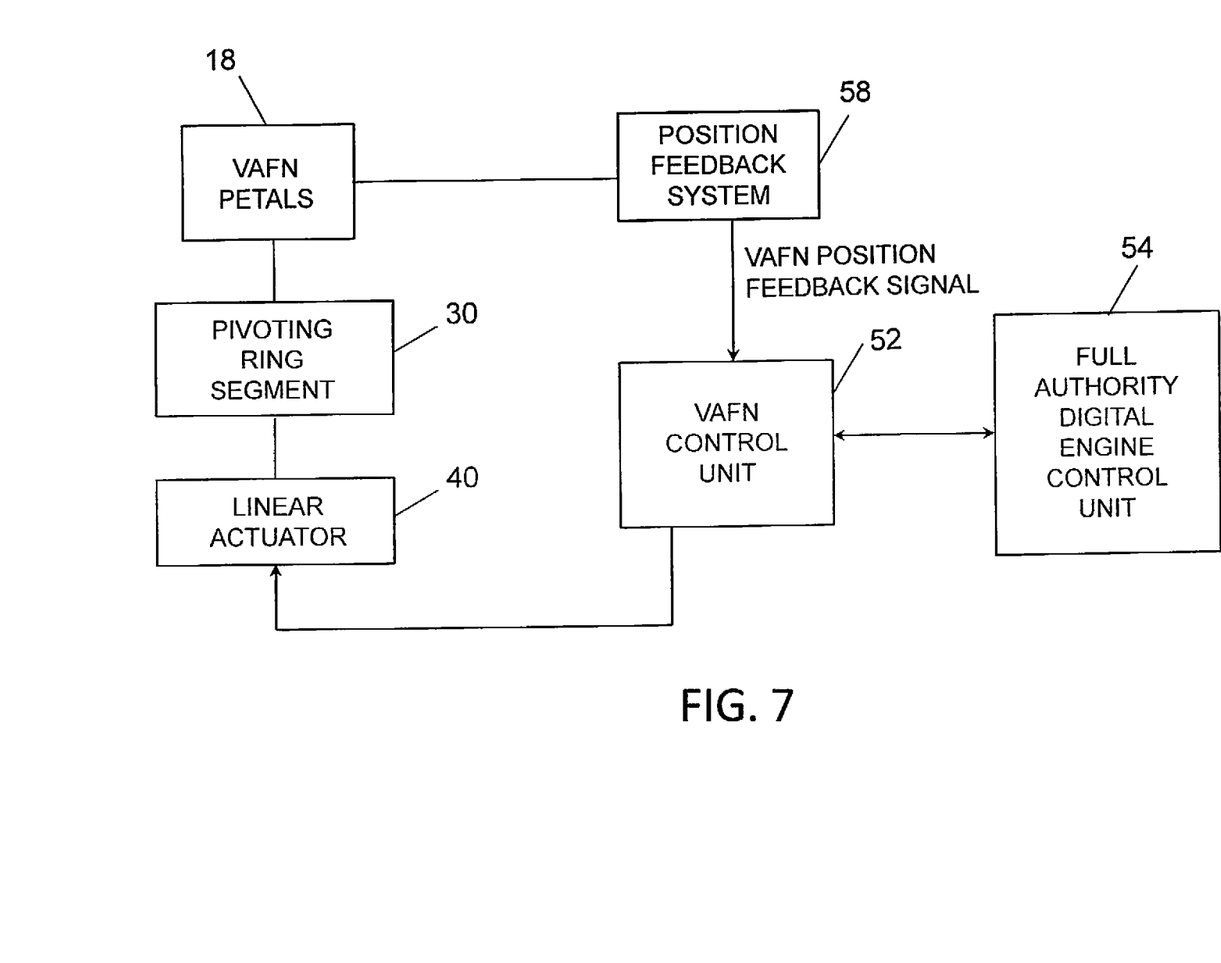
FIG. 7 is a block diagram with blocks representing components of a petal actuation system in accordance with one implementation.

The pivoting of the respective ring segments and the resulting deflection of the petals can be controlled automatically in response to flight conditions. FIG. 7 shows the architecture of a system for controlling variable area fan nozzle petal deflection in accordance with one implementation. The extension of each actuator 40 is controlled by an onboard VAFN control unit 52 that is a closed-loop feedback control system. The VAFN control unit 52 may be implemented as part of a computer system (e.g., a central computer or processor), a subsystem computing module dedicated to controlling petal deflection, or the like. The corresponding ring segment 30 pivots by an angle which is a function of the extension or retraction of the actuator 40. Optionally, the deflection of the petals 18 is measured by a position feedback system 58 (e.g., a fiber optical system) comprising sensors (not shown), installed in, on or near the VAFN petals 18, which sensors output signals representing the petal deflection measurements. The VAFN control unit 52 receives inputs from a full authority digital engine control unit 54 and from the position feedback system 58, and then continuously adjusts the degree of petal deflection by controlling the positions of the distal ends of the actuators 40, thereby adjusting the fan nozzle throat area based on the petal position feedback signals received.

While variable area fan nozzles have been described with reference to various implementations, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed implementations.

As used herein, the term "cam follower" should not be construed in a limiting manner to mean "rollers" or "rolling elements". For example, a pivoting ring segment can carry cam followers comprising sliding elements. As used herein, the terms "hinge beam" and "latch beam" should be respectively construed broadly to encompass either a single integrated beam or an assembly of components. As used herein, the term "hinge" should not be construed in a limiting manner that would exclude a flexible element (also known as a "living hinge").

The invention claimed is:

1. An apparatus installed on a turbofan engine, comprising:
a support structure;
a first petal hinged to said support structure;
a first track attached to or integrally formed with said first petal, said first track comprising a first camming surface and a first inverted camming surface;
a curved ring segment having first and second ends pivotably coupled to said support structure, said curved ring segment being pivotable back and forth between first and second angular positions;
an actuator coupled to said support structure and to said curved ring segment so that said curved ring segment pivots from said first angular position to said second angular position when said actuator changes from a first state to a second state and pivots from said second angular position to said first angular position when said actuator changes from said second state to said first state;
a first cam follower carried by said curved ring segment, said first cam follower being arranged to contact said first camming surface to exert an inward force on said first petal as said curved ring segment pivots from said first angular position to said second angular position; and
a second cam follower carried by said curved ring segment, said second cam follower being arranged to contact said first inverted camming surface to exert an outward force on said first petal as said ring segment pivots from said second angular position to said first angular position.

2. The apparatus as recited in claim 1, further comprising:
a second petal hinged to said support member;
a second track attached to or integrally formed with said second petal, said second track comprising a second camming surface; and
a second cam follower carried by said curved ring segment, said second cam follower being arranged to contact said second camming surface to exert an inward force on said second petal as said curved ring segment pivots from said first angular position to said second angular position.

3. The apparatus as recited in claim 2, wherein said first camming surface has a first contour and said second camming surface has a second contour, said first and second contours being different.

4. The apparatus as recited in claim 2, wherein said first and second cam followers travel respective different distances when said actuator changes from said first state to said second state.

5. The apparatus as recited in claim 1, wherein said first track further comprises a second inverted camming surface, further comprising a third cam follower carried by said curved ring segment, said third cam follower being arranged to contact said second inverted camming surface to exert an outward force on said first petal as said curved ring segment pivots from said second angular position to said first angular position.

6. The apparatus as recited in claim 1, further comprising a biasing means supported by said supported structure and arranged to exert an inward biasing force that urges said first petal to deflect inward.

7. The apparatus as recited in claim 1, wherein said inward force deflects said first petal toward a centerline and said ring segment pivots about an axis which is perpendicular to said centerline.

8. The apparatus as recited in claim 7, wherein said support structure comprises a bulkhead having the shape of a circular arc which is centered at said axis, a hinge beam connected to said bulkhead, and a latch beam connected to said bulkhead, further comprising first and second pivot pins which are coaxial with said axis and supported by said hinge beam and said latch beam respectively, wherein opposing ends of said curved ring segment are pivotably coupled to said first and second pivot pins respectively.

9. A variable area fan nozzle comprising left and right fan nozzle assemblies, each of said left and right fan nozzle assemblies comprising:
a curved support member;
a plurality of petals hinged to respective portions of said support member, said petals of said left and right fan nozzle assemblies defining a throat area;

a hinge beam connected to said support member;
a latch beam connected to said support member;
a curved ring segment having a first end pivotably coupled to said hinge beam and a second end pivotably coupled to said latch beam, said curved ring segment being pivotable back and forth between first and second angular positions;
an actuator coupled to an intermediate portion of said curved ring segment, wherein said curved ring segment can be pivoted from said first angular position to said second angular position by changing a state of said actuator from a first state to a second state and then returned to said first angular position by changing the state of said actuator from said second state to said first state;
a plurality of tracks attached to or integrally formed with respective petals of said plurality of petals, each of said tracks comprising a respective camming surface; and
a first plurality of cam followers carried by said ring segment, said cam followers of said first plurality of cam followers being located at respective angular positions along said curved ring segment,
wherein each cam follower of said first plurality of cam followers contacts a respective one of said camming surfaces to exert inward forces on said petals as said curved ring segment pivots from said first angular position to said second angular position, and
wherein each of said tracks further comprises a first inverted camming surface, and each of said left and right fan nozzle assemblies further comprises a second plurality of cam followers carried by said curved ring segment, wherein each cam follower of said second plurality of cam followers contacts a respective one of said first inverted camming surfaces to exert outward forces on said petals as said curved ring segment pivots from said second angular position to said first angular position.

10. The variable area fan nozzle as recited in claim 9, wherein adjacent camming surfaces have different contours.

11. The variable area fan nozzle as recited in claim 9, wherein adjacent cam followers of said first plurality of cam followers travel different distances on said respective camming surfaces as said curved ring segment pivots from said first angular position to said second angular position.

12. The variable area fan nozzle as recited in claim 9, wherein when the states of said actuators are changed from said first state to said second state, said petals deflect inward to decrease the throat area.

13. The variable area fan nozzle as recited in claim 9, wherein each of said tracks further comprises a second inverted camming surface, and each of said left and right fan nozzle assemblies further comprises a third plurality of cam followers carried by and rotatable relative to said curved ring segment, wherein each cam follower of said third plurality of cam followers contacts a respective one of said second inverted camming surfaces to exert outward forces on said petals as said curved ring segment pivots from said second angular position to said first angular position.

14. The variable area fan nozzle as recited in claim 13, wherein when said actuators are retracted, said petals deflect outward to increase the throat area.

15. The variable area fan nozzle as recited in claim 9, further comprising a plurality of biasing means supported by said support member, each of said biasing means being arranged to exert an inward biasing force that urges a respective one of said petals to deflect inward.

16. A variable area fan nozzle comprising:
a support structure comprising a curved section;
a plurality of petals hinged to respective portions of said curved section of said support member, said petals defining a throat area;
a plurality of tracks attached to or integrally formed with respective petals of said plurality of petals, each of said tracks comprising a respective outward-facing camming surface;
a curved ring segment having first and second ends pivotably coupled to said support structure, said curved ring segment being pivotable back and forth between first and second angular positions;
an actuator coupled to an intermediate portion of said curved ring segment, wherein said curved ring segment can be pivoted from said first angular position to said second angular position by changing a state of said actuator from a first state to a second state and then returned to said first angular position by changing the state of said actuator from said second state to said first state; and
a first plurality of cam followers disposed at spaced intervals along said curved ring segment and in respective alignment with said outward-facing camming surfaces of said tracks, wherein said cam followers of said first plurality exert inward forces on said tracks when the state of said actuator is changed from said first state to said second state,
wherein each of said tracks further comprises at least one inward-facing camming surface, and each of said left and right fan nozzle assemblies further comprises a second plurality of cam followers disposed in respective alignment with said inward-facing camming surfaces of said tracks, wherein said cam followers of said second plurality exert outward forces on said tracks when said actuator is retracted.

17. The variable area fan nozzle as recited in claim 16, wherein each of said cam followers comprises a respective roller.

18. The variable area fan nozzle as recited in claim 16, wherein adjacent cam followers of said first plurality displace different distances on said respective outward-facing camming surfaces as said curved ring segment pivots from said first angular position to said second angular position.

* * * * *